May 16, 1939.    J. OSTER    2,158,145
MOTOR
Filed Jan. 13, 1938
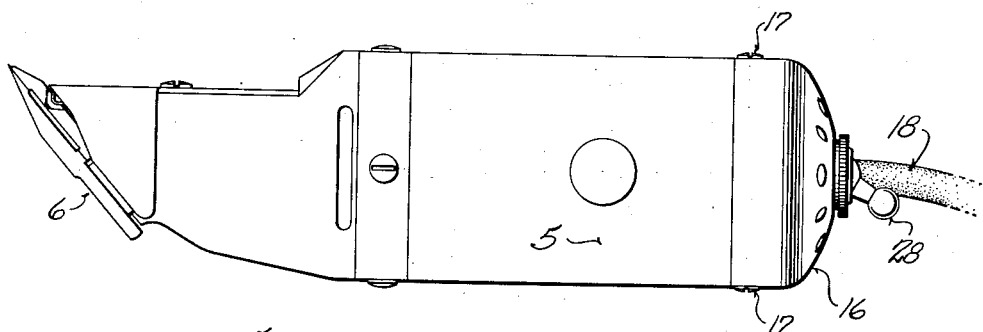
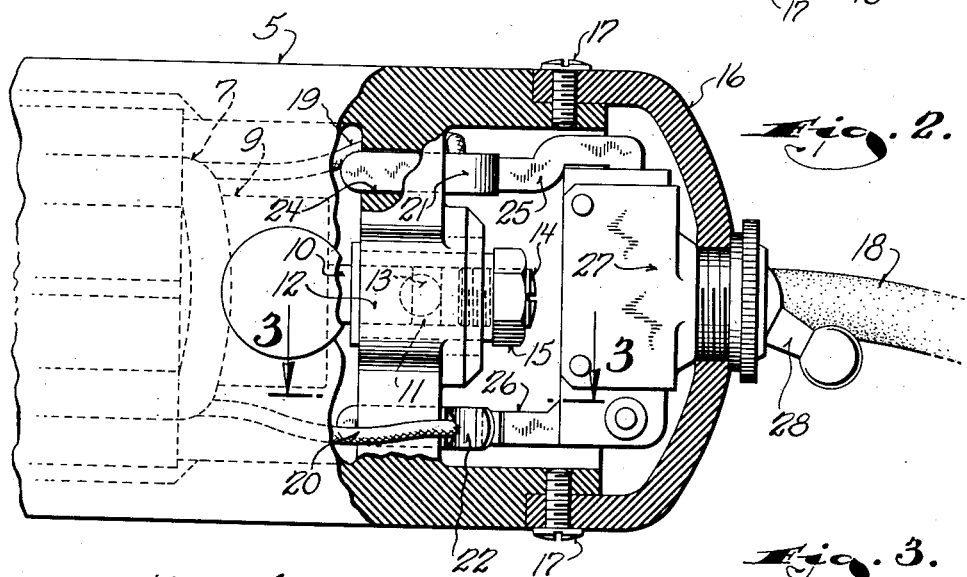
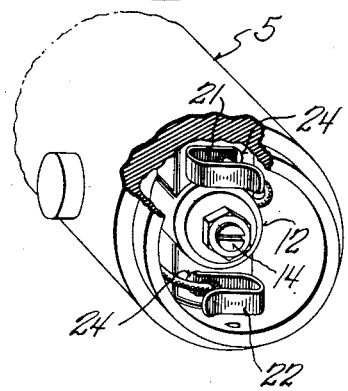 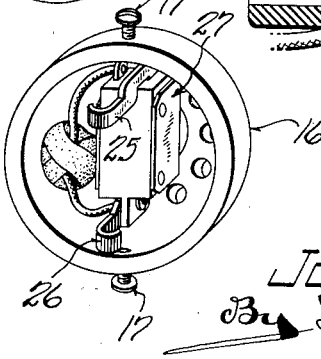 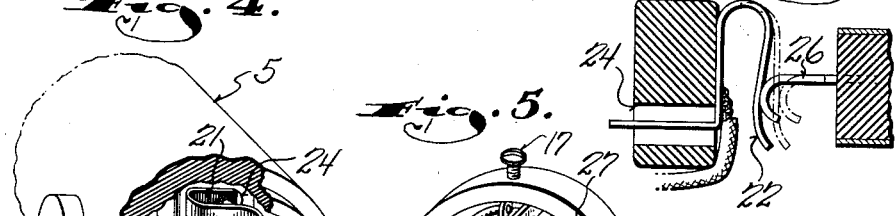
Inventor
John Oster Patented May 16, 1939

2,158,145

UNITED STATES PATENT OFFICE 2,158,145

MOTOR

John Oster, Racine, Wis., assignor to John Oster Manufacturing Company, Racine, Wis., a corporation of Wisconsin Application January 13, 1938, Serial No. 184,803

8 Claims. (Cl. 172—36)

This invention relates to hair clippers and refers particularly to power driven clippers.

In clippers of this type, the electric motor which drives the movable cutter is mounted in the body of the clipper which also serves as a handle. The body should also house a switch by which the current to the motor is turned on and off.

To insure smooth operation, means, such as an adjustable thrust bearing, for taking up end play in the armature shaft should be provided, and in constructions heretofore in use, a removable cap covered this adjusting means and also exposed the terminals to which the electric supply lines or conductors were connected. With this past construction the cord containing the supply lines passed through an opening in the cap so that upon detachment of the cap from the body of the clipper, the cap could be pushed back along the cord leaving the supply lines electrically connected to the motor terminals.

This arrangement made adjustment of the thrust bearing for the armature difficult because of lack of space and also introduced an element of danger in that unless the cord plug was not first pulled from its socket, an operator might receive an electric shock.

The mounting of the switch in these past constructions was also attended with some difficulty.

This invention therefore contemplates as one of its objects to improve the construction of hair clippers with respect to the manner in which the power lines are connected with the motor terminals, and with respect to the mounting of the switch.

It is also an object of this invention to provide an improved construction for hair clippers which is so designed that the removal of the cap from the body of the clipper to expose the means for adjusting the thrust bearing completely disconnects the motor terminals carried by the body of the clipper from the power source and thereby makes adjustment of the thrust bearing safer and also facilitates such adjustment by removing the cords which ordinarily would crowd the small space available for making the desired adjustment.

Another object of this invention is to provide a construction of the character described wherein the switch for turning on and shutting off the current to the motor is carried by the removable cap.

A further object of this invention resides in the provision of novel means for effecting a separable electrical connection between the body carried terminals and terminals on the removable cap with which the supply lines are electrically connected.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawing illustrates one complete example of the physical embodiment of the invention constructed in accordance with the best mode so far devised for the practical application of the principles thereof, and in which:

Figure 1 is a side view of a hair clipper constructed in accordance with this invention;

Figure 2 is an enlarged side view of the rear end portion of the clipper with parts broken away and in section to illustrate structural details;

Figure 3 is a detail sectional view taken through Figure 2 on the plane of the line 3—3;

Figure 4 is a perspective view showing the rear end portion of the body of the clipper; and Figure 5 is a perspective view of the removable cap which closes the rear end of the clipper.

Referring now particularly to the accompanying drawing in which like numerals indicate like parts, the numeral 5 designates the body of a hair clipper constructed in accordance with this invention, the front end of which carries a cutting assembly 6 comprising the customary stationary and movable cutters.

The movable cutter is reciprocated by means of an electric motor housed within the body 5 which also serves as a handle for the clipper, as will be readily apparent.

The motor comprises field windings 7 and an armature 9 and is arranged coaxially with the hollow body 5. At its rear end, the armature has its shaft 10 journalled in a bearing 11 carried by a transverse rib 12 extending across the interior of the body and preferably formed as an integral part thereof.

While the body and the transverse rib 12 may be formed of any suitable material, it is conveniently molded of a thermoplastic.

End play of the armature is adjusted by means of a thrust bearing 13 carried by the transverse rib 12 and adjustable by means of a screw 14 locked in adjusted position by a nut 15. Access is had to the adjusting screw and its lock nut upon removal of a cap 16 which closes the rear end of the body.

The cap, like the body, is preferably molded of a thermoplastic and has a telescoping fit over the rear end of the body where it is readily detachably held in place by screws 17.

Inasmuch as one of the purposes of the present invention is to clear the space at the rear end of the body from obstructions to as great an extent as possible, the electrical connections between the terminals of the motor and the cord 18 which contains the supply lines by which the clipper is connected with a source of electrical current, are readily separable upon removal of the cap 16.

To this end the terminal wires 19 and 20 of the motor are permanently connected to spring clip-like terminals 21 and 22 respectively. The outer ends of the spring clips are hair pin shaped as best shown in Figure 3, and have their inner end portions straight so as to be insertable into holes 24 drilled in the transverse rib 12 near the side wall of the housing. These inner ends of the spring clip terminals fit the holes 24 loosely so that in assembly the wires may be soldered to the clip terminals with the terminals held in as convenient a position as possible, and then after this connection is established, their inner ends are inserted into the holes 24.

The cap 16 carries terminals 25 and 26 adapted for engagement with the outer resilient ends of the clip terminals 21 and 22, respectively. These terminals 25 and 26 are like prongs and are part of a switch structure 27 centrally mounted in the cap with an actuating lever 28 projecting from the end thereof.

The cord 18 passes through an opening in the end wall of the cap to one side of the switch mounting to have its leads electrically connected with the terminals of the switch so that when the cap is in place and the terminals 25 and 26 engage the clip terminals 21 and 22 respectively, opening and closing of the switch 27 connects and disconnects the motor with its source of energy.

It will be noted especially from Figure 3 that as the cap is applied the outer spring ends of the clip terminals 21 and 22 are placed under tension so as to insure good electrical connections between these terminals and their respective cap carried terminals 25 and 26.

From the foregoing description taken in connection with the accompanying drawing, it will be apparent to those skilled in the art that this invention greatly facilitates the assembly of hair clippers of the character described; and that by having the live terminals as well as the switch carried by the removable cap the danger of possible short circuiting and shocks is eliminated during adjustment of the thrust bearing controlling end play of the motor armature.

It will also be seen that the detachable connection between the motor terminals and the terminals carried by the cap eliminates the possibility of mutilation of the insulation on the wires as by an operator removing the switch cap and making necessary adjustments.

What I claim as my invention is:

1. In a device of the character described: a hollow body having an open end; an electric motor within the body; terminals for the motor carried by the body at its open end; a cap removably connected with the open end of the body to close the same and cover said motor terminals; terminals carried by said cap in position to engage the motor terminals upon proper application of the cap to the body; an electric switch carried by the cap and having said cap carried terminals connected therewith; and conductors connected with the switch whereby the switch and its associated terminals are removable from the body as a unit with the cap.

2. In a hair clipper of the character described: a hollow body having an open end; an electric motor within the body; terminals for the motor comprising spring clips exposed at the open end of the body; a cap removably secured to the open end of the body to close the same and cover said motor terminals; terminals carried by the cap in position to engage and tension said spring clips upon proper application of the cap to the body to establish good electrical connection between the spring clips and the cap carried terminals; electric conductors permanently connected with the cap carried terminals; and an electric switch carried by the cap and electrically interposed between the conductors and the cap carried terminals.

3. In a hair clipper of the character described: a hollow body having an open end; an electric motor within the hollow body; a bearing for one end of the motor armature adjacent to the open end of the hollow body; means adjacent to said bearing and accessible from the open end of the body for effecting an adjustment of said bearing; terminals for the motor at opposite sides of said bearing and accessible from the open end of the body; a removable cap to close the open end of the body and cover said terminals; terminals carried by the cap in position to engage the motor terminals upon proper application of the cap to the body; and electric conductors permanently connected with the cap terminals whereby removal of the cap completely disconnects the motor terminals from a source of electricity with which the conductors may be connected and exposes the bearing adjusting means for manipulation without danger of the possibility of electric shock or short circuiting.

4. In a hair clipper: a hollow body; an electric motor within the hollow body, said body having one end open; a transverse wall in the body at a distance inwardly of its open end; a bearing for one end of the motor carried by said transverse wall; terminals for the motor comprising spring clips electrically connected with the opposite sides of the motor; means for mounting said spring clips comprising end portions projecting from the clips and loosely entering holes formed in said transverse wall at opposite sides of the motor bearing; a cap removably fitted to the open end of the body; terminals rigidly mounted on the cap in position to engage and compress said spring clips upon proper application of the cap to the body; and conductors permanently connected with the terminals of the cap.

5. In a hair clipper: a hollow body; an electric motor within the hollow body, said body having one end open; a transverse wall in the body at a distance inwardly of its open end; a bearing for one end of the motor carried by said transverse wall; terminals for the motor comprising spring clips electrically connected with the opposite sides of the motor; means for mounting said spring clips comprising end portions projecting from the clips and loosely entering holes formed in said transverse wall at opposite sides of the motor bearing; a cap removably fitted to the open end of the body; terminals rigidly mounted on the cap in position to engage and compress said spring clips upon proper application of the cap to the body; conductors permanently connected with the terminals of the cap; and an electric switch rigidly mounted on the cap and electrically interposed between the conductors and the cap carried terminals.

6. In a device of the character described: a hollow body; an electric motor within the hollow body; terminals for the motor exposed at one end of the hollow body; a cap removably fitted to said end of the body to cover said motor terminals; an electric switch carried by the cap; terminals carried by the switch and having contact portions engaging with said motor terminals; and conductors permanently connected with the switch.

7. In a device of the character described: a hollow body having an open end; a transverse wall in the body near its open end having spaced holes therein; an electric motor within the hollow body and behind said transverse wall; terminals for the motor, each electrically connected with one side of the motor and each having a part loosely projected into one of said holes in the transverse wall to hold the terminal in proper position; a cap removably fitted to and closing the open end of the body; terminals rigidly carried by the cap for engaging said motor terminals, one of each pair of engaging terminals being in the form of a spring clip to be placed under tension by the terminal engaging it so that the said motor terminal parts are retained in their holes under spring tension; and electric conductors permanently connected with the cap carried terminals.

8. In a device of the character described: a hollow body; an electric motor within the hollow body; a transverse wall near one end of the body and having spaced holes therein; terminals for the motor comprising hair pin shaped spring clips electrically connected with the opposite sides of the motor; means for mounting said spring clips comprising end portions extending from the clips and loosely projecting into said holes in the transverse wall; a cap removably fitted to and closing said end of the body; terminals rigidly carried by the cap in position to engage and compress said hair pin shaped spring clips and secure the end portions thereof in their holes under spring tension; and electric conductors permanently connected with the cap carried terminals for connecting the motor terminals with a source of electric current.

JOHN OSTER.